United States Patent
Hennessy et al.

(10) Patent No.: US 7,126,130 B2
(45) Date of Patent: *Oct. 24, 2006

(54) DIRECT SCINTILLATOR COATING FOR RADIATION DETECTOR ASSEMBLY LONGEVITY

(75) Inventors: William Andrew Hennessy, Schenectady, NY (US); Charles Edward Baumgartner, Niskayuna, NY (US); Paul Justin Janiszewski, Watervliet, NY (US); Jeffrey Jon Shaw, Ballston Lake, NY (US); Ching-Yeu Wei, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 218 days.

This patent is subject to a terminal disclaimer.

(21) Appl. No.: 10/735,311

(22) Filed: Dec. 12, 2003

(65) Prior Publication Data

US 2004/0124362 A1    Jul. 1, 2004

Related U.S. Application Data

(63) Continuation-in-part of application No. 10/003,839, filed on Dec. 6, 2001, now Pat. No. 6,720,561.

(51) Int. Cl.
*G01T 1/20* (2006.01)
(52) U.S. Cl. .................................. 250/370.11
(58) Field of Classification Search .......... 250/370.11, 250/370.01, 370.08, 363.2, 367, 370.09
See application file for complete search history.

(56) References Cited

U.S. PATENT DOCUMENTS

| 4,546,251 | A  | * | 10/1985 | Schaffer .................. 250/252.1 |
| 5,179,284 | A  | * | 1/1993  | Kingsley et al. ....... 250/370.11 |
| 6,278,118 | B1 |   | 8/2001  | Homme et al. |
| 6,573,506 | B1 | * | 6/2003  | Sato et al. .............. 250/361 R |
| 6,720,561 | B1 | * | 4/2004  | Baumgartner et al. . 250/370.11 |
| 2001/0054694 | A1 |   | 12/2001 | Kusuyama et al. |
| 2003/0001100 | A1 | * | 1/2003  | Dejule .................... 250/370.11 |
| 2003/0107001 | A1 |   | 6/2003  | Baumgartner et al. |

FOREIGN PATENT DOCUMENTS

| EP | 0932053 | 7/1999 |
| EP | 1115011 | 7/2001 |

\* cited by examiner

*Primary Examiner*—Otilia Gabor
*Assistant Examiner*—Christine Sung
(74) *Attorney, Agent, or Firm*—Fletcher Yoder

(57) ABSTRACT

A radiation detector assembly, in some aspects, includes a detector substrate and a detector matrix array disposed on the detector substrate. A scintillator material is disposed on the detector matrix array and a moisture resistant layer is disposed on the scintillator material. The moisture resistant layer includes a plurality of sub-layers. The assembly also includes a protective cover disposed over the detector substrate and the moisture resistant layer, and an adhesive material disposed between the detector substrate and the cover. The adhesive material in some configurations is disposed so that it is not in contact with the moisture resistant layer.

30 Claims, 2 Drawing Sheets

DIRECT SCINTILLATOR COATING FOR RADIATION DETECTOR ASSEMBLY LONGEVITY

CROSS REFERENCE TO RELATED APPLICATIONS

This application is a continuation in part of and claims priority to U.S. patent application Ser. No. 10/003,839, filed Dec. 6, 2001, now U.S. Pat. No. 6,720,561 entitled "Direct CSI Scintillator Coating for Improved Digital X-Ray Detector Assembly Longevity," which is hereby incorporated by reference in its entirety.

STATEMENT REGARDING FEDERALLY SPONSORED RESEARCH & DEVELOPMENT

The U.S. Government may have certain rights in this invention pursuant to Contract No. 70NANB5H1148by the National Institute of Standards and Technology (NIST).

BACKGROUND OF THE INVENTION

This invention relates generally to the field of radiation detector assemblies and more particularly to the detector assemblies having coatings for improved longevity. Such radiation detector assemblies are particularly suitable for use in digital X-ray detector assemblies such as those used in medical or industrial inspection applications.

In an X-ray detector assembly, an amorphous silicon detector substrate is coated with a vapor phase deposited X-ray scintillator material. The scintillator material generates photons isotropically from the absorption of the X-rays. A reflective layer is required above the scintillator layer to reflect photons, which are emitted in a direction away from the detector substrate, back towards the detector substrate.

One important factor in medical imaging applications is the detector spatial resolution. Photons, which are generated in the scintillator material over one detector pixel, must be counted only by that underlying pixel to obtain a high image resolution. Photons that are scattered to adjacent pixels reduce the clarity of the image. To reduce photon scatter, the scintillator material is vapor deposited in columnar or needle form. Individual needles are separated from one another and they possess aspect ratios (length/diameter) of 100 or greater. Photons traveling down the scintillator needles tend to be contained within the individual needle due to the higher refractive index of scintillator material over air, provided that the individual scintillator needles remain separated. The Cesium Iodide (CsI) scintillator material is known to be a very hydroscopic salt. Exposure of the CsI scintillator material to moisture can cause the CsI scintillator material to absorb the moisture, which further causes the individual CsI scintillator needles to coalesce, thereby reducing the detector image quality.

BRIEF DESCRIPTION OF THE INVENTION

Some configurations of the present invention therefore provide a radiation detector assembly that includes a detector substrate and a detector matrix array disposed on the detector substrate. A scintillator material is disposed on the detector matrix array and a moisture resistant layer is disposed on the scintillator material. The moisture resistant layer includes a plurality of sub-layers. The assembly also includes a protective cover disposed over the detector substrate and the moisture resistant layer and an adhesive material disposed between the detector substrate and the cover. The adhesive material is disposed so that it is not in contact with the moisture resistant layer.

In various configurations, the present invention also provides an X-ray detector assembly. The X-ray detector assembly includes a detector substrate and a detector matrix array disposed on the detector substrate. The assembly further includes an X-ray scintillator material disposed on the detector matrix array. A moisture resistant layer is disposed on the scintillator material. The moisture resistant layer includes a plurality of sub-layers. The assembly also includes a protective cover disposed over the detector substrate and the moisture resistant layer; and an adhesive material disposed between the detector substrate and the cover. The adhesive material is disposed so that it is not in contact with the moisture resistant layer.

Still other configurations of the present invention provide a radiation detector assembly that includes a detector substrate and a detector matrix array disposed on the detector substrate. The assembly also includes a contact finger area disposed on the detector substrate that is in electrical communication with the detector matrix array. A scintillator material is disposed on the detector matrix array. The assembly further includes a moisture resistant layer disposed on the scintillator material. The moisture resistant layer includes a plurality of sub-layers. A protective cover is disposed over the detector substrate and the moisture resistant layer. The protective cover is bonded to the moisture resistant layer using an adhesive material. Also, the moisture resistant layer is disposed so that an edge portion of the moisture resistant layer is bonded to the detector substrate between the adhesive material and the contact finger area.

Also in some configurations, the present invention provides an X-ray detector assembly that includes a detector substrate and a detector matrix array disposed on the detector substrate. The X-ray detector assembly also includes a contact finger area disposed on the detector substrate that is in electrical communication with the detector matrix array. An X-ray scintillator material is disposed on the detector matrix array. A moisture resistant layer is disposed on the scintillator material. The moisture resistant layer includes a plurality of sub-layers. The X-ray detector assembly further includes a protective cover disposed over the detector substrate and the moisture resistant layer. The protective cover is bonded to the moisture resistant layer using an adhesive material. Also, the moisture resistant layer is disposed so that an edge portion of the moisture resistant layer is bonded to the detector substrate between the adhesive material and the contact finger area.

Various configurations of the present invention thus provide a radiation detector with an encapsulating coating for the scintillator that physically maintains needle separation in the presence of moisture. The encapsulating coating in some configurations is substantially transparent to visible light as well as to radiation to be detected, such as X-ray radiation. The overall exposure of the scintillator to moisture is limited in various configurations of the present invention with a seal against the outside atmosphere. Moreover, the scintillator and detector matrix are advantageously protected from mechanical damage in various configurations.

BRIEF DESCRIPTION OF THE DRAWINGS

Both FIGS. 1 and 2 represent only a portion of a cross-section of the respective radiation detector assemblies, which extend on the left side beyond the extent of the drawings.

DETAILED DESCRIPTION OF THE INVENTION

Figure 1:
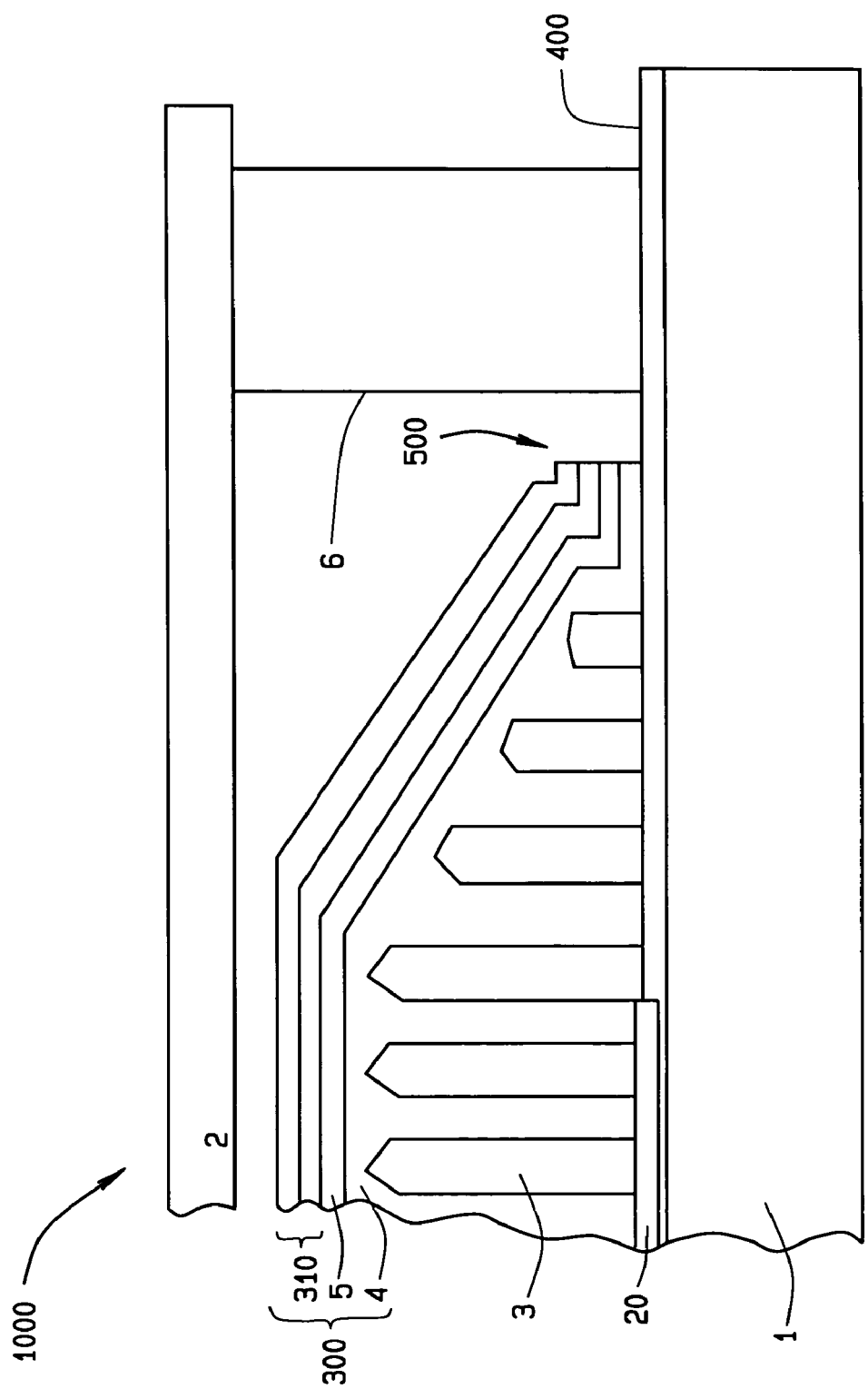
FIG. 1 is a cross-sectional view representative of configurations of a radiation detector assembly of the present invention in which a moisture resistant layer is disposed so as to cover a scintillator layer and wherein an edge portion of the moisture resistant layer falls inside of an adhesive seal.

The present invention provides, in some configurations, a radiation detector assembly that includes a detector substrate and a detector matrix array disposed on the detector substrate. The purpose of the detector matrix is to convert light into electrical signals that may then be read out from the detector by means of a series of contact fingers. The assembly further provides a scintillator material disposed at least over the detector matrix array to convert incident radiation, for example X-ray radiation, into light. The assembly further includes a moisture resistant layer comprising a plurality of sub-layers disposed on the scintillator material. The moisture resistant layer in some configurations comprises an encapsulating coating disposed on the scintillator material to prevent scintillator needles from fusing together in the presence of moisture, a reflective layer to direct photons, which otherwise would escape, back to the detector, and one or more layers disposed on the reflective layer to provide additional moisture protection and to provide a structure that is robust to pinhole defects. Some configurations of the present invention further provide a moisture resistant, mechanically protective cover comprising an aluminum foil attached to either side of a graphite resin core. The cover is attached to the detector substrate using an epoxy bead. The moisture resistant, mechanically protective cover attaches to the detector substrate in an area between the detector matrix and a set of peripheral contact fingers.

An encapsulating coating applied to the scintillator physically maintains needle separation in the presence of moisture. A desirable property for the encapsulating coating to have is that it be substantially transparent to visible light as well as to the radiation sought to be detected, such as X-ray radiation. The overall exposure of the scintillator to moisture is limited by sealing it against the outside atmosphere. A cover is provided to protect the scintillator and detector matrix from mechanical damage.

One suitable encapsulating coating is parylene™ (a trademark of the Specialty Coating Systems, Inc. 5701 West Minnesota St. Indianapolis, Ind. 46241), because of its ability to penetrate into the small gaps between the scintillator needles. Parylene is substantially transparent to visible light and is relatively easy to apply at low temperatures. Parylene is sold commercially in different varieties such as Parylene-N (para-xylylene), Parylene-C (mono-chloro-poly-para-xylylene), and Parylene-D (di-chloro-poly-para-xylylene). New variations may also be developed in the future. The use of a particular type of Parylene is determined in accordance with the specific application of the radiation imaging device. Additionally, any combination of Parylene type and overall number of parylene sublayers may be used in the present invention.

The reflective sub-layer can comprise silver, aluminum, or other highly reflective metals. In some configurations, the reflectivity of the reflective layer is further enhanced through the use of dielectric layers, such as $MgF_2$, SiO, $SiO_2$, $TiO_2$ and the like, disposed beneath the metallic reflector. By appropriately choosing the index of refraction and the thickness of the dielectric layers, reflectivity is enhanced.

In some configurations of the present invention, additional sub-layers are disposed on top of the reflective sub-layer. Such additional sub-layers provide additional moisture protection and form a structure that is resistant to pinhole defects in the metal films and to surface contamination by particulates. Alternating layers of parylene and either titanium or aluminum metal are used in some configurations of the present invention as suitable additional sub-layers, although other materials can be used as indicated below. The number of layers depends upon the requirements of the specific application for which the detector array is used. Many other combinations of layers are possible and the example cited above is not intended to be exclusive.

In some configurations of the present invention, a moisture resistant, mechanically protective cover is disposed on top of the moisture resistant layer. The cover is affixed to the detector substrate using an adhesive bead, such as an epoxy bead. The cover slows moisture ingress to the assembly and provides mechanical protection. The composition and construction of the cover depends upon the mechanical and moisture-protection requirements of the application. As a nonexclusive example, the moisture resistant cover can comprise a graphite/resin core covered on both sides by an aluminum foil. If the moisture resistant layer provides adequate moisture protection for a given application, the cover may serve primarily to protect the assembly from mechanical shock. In such cases, the cover material can comprise a plastic.

In some configurations of the present invention and referring to FIG. 1, a moisture resistant layer 300 is disposed in a radiation detector assembly 1000 so as to cover a scintillator layer 3 and wherein an edge portion 500 of moisture resistant layer 300 falls inside of an adhesive seal 6. In some configurations, radiation detector assembly 1000 is an X-ray detector assembly, and scintillator layer 3 comprises an X-ray scintillator (i.e., a scintillator material). Suitable X-ray scintillators include cesium iodide (CsI) needles. The term "cesium iodide needles" is intended to include within its scope doped CsI such as CsI(Tl) and CsI(Na), without necessarily excluding other forms of CsI. Some other suitable X-ray scintillators include NaI(Tl) and LiI(Eu). An X-ray scintillator may comprise combinations of such scintillators. Moreover, the list of suitable X-ray scintillators provided herein is intended for examplary purposes only and is not exhaustive.

Scintillator material 3 is disposed on a detector matrix array 20 and detector matrix array 20 is disposed on a detector substrate 1. (As used herein, detector matrix array 20 typically refers to an array of photosensors disposed for detecting photons passing from scintillator material 3 in response to incident radiation.) An encapsulating coating 4 is disposed on scintillator layer 3 and a portion of detector substrate 1 inside of adhesive seal 6, which can comprise a suitable epoxy. A non-exhaustive list of suitable materials for encapsulating coating 4 includes magnesium fluoride ($MgF_2$), silicon oxide (SiO), aluminum fluoride ($AlF_3$), titanium dioxide ($TiO_2$), silicon dioxide ($SiO_2$), and a polymer comprising one or more types of substituted or unsubstituted para-xylylene materials, or combinations thereof. Electrical communication with photosensors of detector matrix array 20 is provided by a contact finger area 400 accessible by an electrical connector (not shown).

A reflective sub-layer 5 is disposed on encapsulating coating 4 so as to cover at least detector matrix array 20. A non-exhaustive list of suitable materials for reflective sub-layer 5 includes silver (Ag), gold (Au), aluminum (Al), and a polyester film with a layer of pressure-sensitive adhesive, and combinations thereof.

For further moisture resistance, additional sub-layers 310 are disposed on reflective sub-layer 5. Although two additional sub-layers 310 are shown in FIG. 1, a greater or lesser number is used in some other configurations, depending upon requirements of a particular application. In some configurations, sub-layers 310 comprise alternating layers of metal (such as titanium or aluminum) and parylene, but other configurations are not limited to these materials and can employ different materials. Desirable properties of sub-layers 310 are moisture-resistance, substantial transparency to the radiation to be detected (e.g., X-rays), and resistance to pinhole defects. A non-exhaustive list of materials includes titanium, aluminum, nickel, a polymer comprising one or more types of substituted or unsubstituted para-xylylene materials, magnesium fluoride ($MgF_2$), silicon oxide (SiO), aluminum fluoride ($AlF_3$), silicon dioxide ($SiO_2$), titanium dioxide ($TiO_2$), a silicone potting compound, and combinations thereof. Together with encapsulating coating layer 4 and reflective sub-layer 5, sub-layers 310 comprise a moisture resistant layer 300. Adhesive material 6, such as a suitable epoxy, is disposed between detector substrate 1 and a cover 2 so as to bond cover 2 to substrate 1. Adhesive material 6 is disposed so that it is not in contact with moisture resistant layer 300. Cover 2 may be any suitable material protective material, for example, graphite or aluminized graphite. Desirable properties of a cover 2 material include resistance to moisture penetration and substantial transparency to the radiation sought to be detected (for example, X-ray radiation), and reflectivity to visible light.

Figure 2:
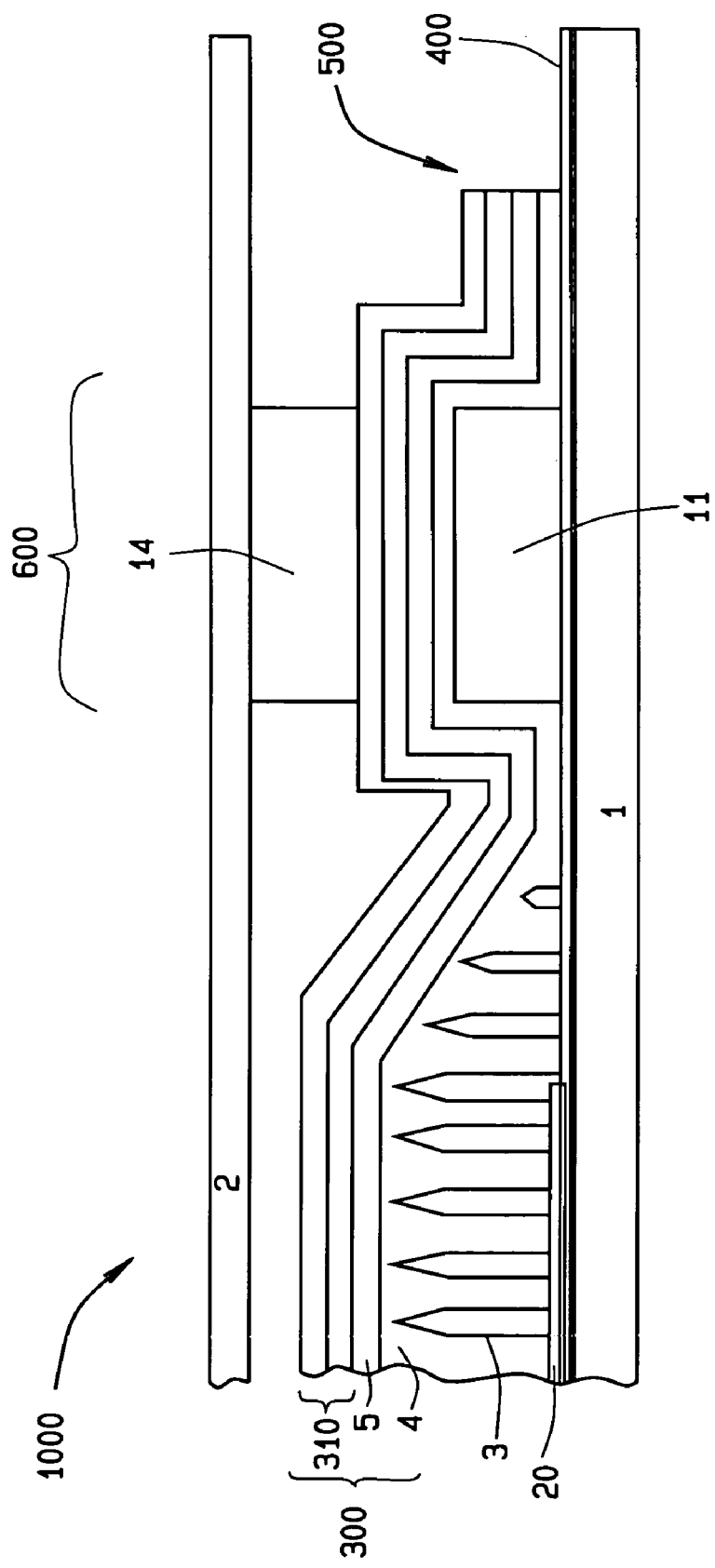
FIG. 2 is a cross-sectional view representative of configurations of a radiation detector assembly of the present invention in which a moisture resistant layer is disposed so as to cover a scintillator layer and to extend beyond an epoxy seal area such that an edge portion of the moisture resistant layer falls outside of epoxy seal area but inside a contact finger area.

In some other configurations of the present invention and referring to FIG. 2, moisture resistant layer 300 is disposed in a radiation detector assembly 1000 so as to cover a scintillator layer 3 and to extend beyond an epoxy seal area 600 such that an edge portion 500 of moisture resistant layer 300 falls outside of epoxy seal area 600 but inside a contact finger area 400. In some of these configurations, radiation detector assembly 1000 is an X-ray detector assembly comprising a scintillator material 3, such as cesium iodide (CsI) needles or another suitable X-ray scintillator material such as those discussed above, disposed on a detector matrix array 20. Detector matrix array 20 is disposed on a detector substrate 1. Encapsulating coating 4 is disposed on scintillator layer 3 and a portion of detector substrate 1 inside of adhesive material 6. A non-exhaustive list of suitable materials for encapsulating coating 4 includes magnesium fluoride ($MgF_2$), silicon oxide (SiO), aluminum fluoride ($AlF_3$), titanium dioxide ($TiO_2$), silicon dioxide ($SiO_2$), and a polymer comprising one or more types of substituted or unsubstituted para-xylylene materials, or combinations thereof. Electrical communication with photosensors of detector matrix array 20 is provided by a contact finger area 400 accessible by an electrical connector (not shown).

A reflective sub-layer 5 is disposed on encapsulating coating 4 so as to cover at least detector matrix array 20. A non-exhaustive list of suitable materials for reflective sub-layer 5 includes silver (Ag), gold (Au), aluminum (Al), and a polyester film with a layer of pressure-sensitive adhesive, and combinations thereof.

For further moisture resistance, additional sub-layers 310 are deposited on reflective sub-layer 5. Encapsulating coating 4, reflective sub-layer 5 and sub-layers 310 comprise a moisture resistant layer 300. In some configurations, sub-layers 310 comprise alternating layers of metal (such as titanium or aluminum) and parylene. A greater or lesser number of sub-layers 310 are used in some other configurations, depending upon the requirements of a particular application. Also, other configurations are not limited to the materials recited herein and can employ different materials in sublayers 310. A non-exhaustive list of materials includes titanium, aluminum, nickel, a polymer comprising one or more types of substituted or unsubstituted para-xylylene materials, magnesium fluoride ($MgF_2$), silicon oxide (SiO), aluminum fluoride ($AlF_3$), silicon dioxide ($SiO_2$), titanium dioxide ($TiO_2$), a silicone potting compound, and combinations thereof. Desirable properties of sub-layer materials 310 are moisture-resistance, substantial transparency to the radiation sought to be detected, such as X-ray radiation, and resistance to pin-hole defects. Moisture resistant layer 300 is disposed so as to cover scintillator layer 3, a first epoxy layer 11, and a portion of detector substrate 1 outside of first epoxy layer 11 but inside of contact finger area 400. A second epoxy layer 14 is applied to moisture resistant cover 2, and cover 2 is bonded to the rest of assembly 1000 using a second epoxy layer 14.

Adhesion of moisture resistant layer 300 to detector substrate 1 is improved in some configurations by surface treatment of substrate 1 or by use of an adhesion promoter. The number of epoxy layers 11, 14 is different in some configurations as may be required by some specific applications. For example, in some configurations, first epoxy layer 11 is absent and cover 2 is bonded directly to detector substrate 1 via epoxy layer 14.

It will be appreciated that configurations of the present invention thus provide a radiation detector with an encapsulating coating for the scintillator that physically maintains needle separation in the presence of moisture. The encapsulating coating is substantially transparent to visible light as well as to radiation to be detected, such as X-ray radiation. The overall exposure of the scintillator to moisture is limited in configurations of the present invention with a seal against the outside atmosphere. Moreover, the scintillator and detector matrix are advantageously protected from mechanical damage.

While the invention has been described in terms of various specific embodiments, those skilled in the art will recognize that the invention can be practiced with modification within the spirit and scope of the claims.

What is claimed is:
1. A radiation detector assembly comprising:
a detector substrate;
a detector matrix array disposed on said detector substrate;
a scintillator material disposed on said detector matrix array;
a moisture resistant layer disposed on said scintillator material, said moisture resistant layer comprising a plurality of sub-layers,
a protective cover disposed over said detector substrate and said moisture resistant layer; and
an adhesive material disposed between said detector substrate and said cover;

wherein said adhesive material is disposed so that it is not in contact with said moisture resistant layer.

2. A detector assembly in accordance with claim 1, wherein said moisture resistant layer further comprises an encapsulating coating disposed on said scintillator material and a reflective sub-layer disposed on said encapsulating coating.

3. A detector assembly in accordance with claim 2, wherein said moisture resistant layer further comprising one or more moisture resistant sub-layers disposed on said reflective layer, said one or more moisture resistant sub-layers being substantially transparent to a radiation to be detected by said detector assembly.

4. A detector assembly in accordance with claim 3, wherein said plurality of sub-layers are selected from a group consisting of titanium, aluminum, nickel, a polymer comprising one or more types of substituted or unsubstituted para-xylylene materials, magnesium fluoride ($MgF_2$), silicon oxide (SiO), aluminum fluoride ($AlF_3$), silicon dioxide ($SiO_2$), titanium dioxide ($TiO_2$), a silicone potting compound and combinations thereof.

5. A detector assembly in accordance with claim 2, wherein said encapsulating coating comprises a material selected from a group consisting of magnesium fluoride ($MgF_2$), silicon oxide (SiO), aluminum fluoride ($AlF_3$), titanium dioxide ($TiO_2$), silicon dioxide ($SiO_2$), a polymer comprising one or more layers of substituted or unsubstituted para-xylylene materials, and combinations thereof.

6. A detector assembly in accordance with claim 2, wherein said reflective layer is selected from a group consisting of silver, gold, aluminum, a polyester film with a layer of pressure sensitive adhesive, and combinations thereof.

7. A detector assembly in accordance with claim 1 wherein said protective cover comprises graphite.

8. A detector assembly in accordance with claim 1 wherein said protective cover comprises plastic.

9. An X-ray detector assembly comprising:
a detector substrate;
a detector matrix array disposed on said detector substrate;
an X-ray scintillator material disposed on said detector matrix array;
a moisture resistant layer disposed on said scintillator material, said moisture resistant layer comprising a plurality of sub-layers,
a protective cover disposed over said detector substrate and said moisture resistant layer; and
an adhesive material disposed between said detector substrate and said cover;
wherein said adhesive material is disposed so that it is not in contact with said moisture resistant layer.

10. An X-ray detector assembly in accordance with claim 9 wherein said moisture resistant layer further comprises an encapsulating coating layer disposed on said scintillator material and a reflective sub-layer disposed on said encapsulating coating layer.

11. An X-ray detector assembly in accordance with claim 10 said moisture resistant layer further comprising one or more moisture resistant sub-layers disposed on said reflective layer, said one or more moisture resistant sub-layers being substantially transparent to X-rays.

12. An X-ray detector assembly in accordance with claim 9 wherein said protective cover comprises graphite.

13. An X-ray detector assembly in accordance with claim 9 wherein said protective cover comprises plastic.

14. An X-ray detector assembly in accordance with claim 9 wherein said X-ray scintillator is selected from the list consisting of cesium iodide (CsI) CsI(Tl), CsI(Na), NaI(Tl), LiI(Eu), and combinations thereof.

15. An X-ray detector assembly in accordance with claim 9 wherein said X-ray scintillator comprises cesium iodide (CsI) needles.

16. A radiation detector assembly comprising:
a detector substrate;
a detector matrix array disposed on said detector substrate;
a contact finger area disposed on said detector substrate and in electrical communication with said detector matrix array;
a scintillator material disposed on said detector matrix array;
a moisture resistant layer disposed on said scintillator material, said moisture resistant layer comprising a plurality of sub-layers; and
a protective cover disposed over said detector substrate and said moisture resistant layer;
wherein said protective cover is bonded to said moisture resistant layer using an adhesive material; and
wherein said moisture resistant layer is disposed so that an edge portion of said moisture resistant layer is bonded to said detector substrate between said adhesive material and said contact finger area.

17. A radiation detector assembly in accordance with claim 16, wherein said moisture resistant layer further comprises an encapsulating coating layer disposed on said scintillator material and a reflective sub-layer disposed on said encapsulating coating layer.

18. A radiation detector assembly in accordance with claim 17, wherein said plurality of sub-layers are selected from a group consisting of titanium, aluminum, nickel, a polymer comprising one or more types of substituted or unsubstituted para-xylylene materials, magnesium fluoride ($MgF_2$), silicon oxide (SiO), aluminum fluoride ($AlF_3$), silicon dioxide ($SiO_2$), titanium dioxide ($TiO_2$), a silicone potting compound, and combinations thereof.

19. A radiation detector assembly in accordance with claim 17, wherein said moisture resistant layer further comprises one or more moisture resistant sub-layers disposed on said reflective layer, said one or more moisture resistant sub-layers being substantially transparent to X-rays.

20. A radiation detector assembly in accordance with claim 17, wherein said encapsulating coating layer is selected from a group consisting of magnesium fluoride ($MgF_2$), silicon oxide (SiO), aluminum fluoride ($AlF_3$), Titanium dioxide ($TiO_2$), silicon dioxide ($SiO_2$), a polymer comprising one or more tiers of substituted or unsubstituted para-xylylene materials, and combinations thereof.

21. A radiation detector assembly as in claim 17, wherein said reflective layer is selected from a group consisting of silver, gold, aluminum, a polyester film with a layer of pressure sensitive adhesive, and combinations thereof.

22. A detector assembly in accordance with claim 16 wherein said protective cover comprises graphite.

23. A detector assembly in accordance with claim 16 wherein said protective cover comprises plastic.

24. An X-ray detector assembly comprising:
a detector substrate;
a detector matrix array disposed on said detector substrate;

a contact finger area disposed on said detector substrate and in electrical communication with said detector matrix array;

an X-ray scintillator material disposed on said detector matrix array;

a moisture resistant layer disposed on said scintillator material, said moisture resistant layer comprising a plurality of sub-layers; and a protective cover disposed over said detector substrate and said moisture resistant layer;

wherein said protective cover is bonded to said moisture resistant layer using an adhesive material; and wherein said moisture resistant layer is disposed so that an edge portion of said moisture resistant layer is bonded to said detector substrate between said adhesive material and said contact finger area.

25. An X-ray detector assembly in accordance with claim 24 wherein said moisture resistant layer further comprises an encapsulating coating layer disposed on said scintillator material and a reflective sub-layer disposed on said encapsulating coating layer.

26. An X-ray detector assembly in accordance with claim 25 said moisture resistant layer further comprising one or more moisture resistant sub-layers disposed on said reflective layer, said one or more moisture resistant sub-layers being substantially transparent to X-rays.

27. An X-ray detector assembly in accordance with claim 24 wherein said protective cover comprises graphite.

28. An X-ray detector assembly in accordance with claim 24 wherein said protective cover comprises plastic.

29. An X-ray detector assembly in accordance with claim 24 wherein said X-ray scintillator material is selected from the list consisting of cesium iodide (CsI) CsI(Tl), CsI(Na), NaI(Tl), LiI(Eu), and combinations thereof.

30. An X-ray detector assembly in accordance with claim 24 wherein said X-ray scintillator material comprises cesium iodide (CsI) needles.

* * * * *